Patented Oct. 10, 1933

1,929,453

UNITED STATES PATENT OFFICE

1,929,453

SYNTHETIC RUBBER-LIKE COMPOSITION AND METHOD OF MAKING SAME

Waldo L. Semon, Silver Lake Village, Ohio, assignor to The B. F. Goodrich Company, New York, N. Y., a corporation of New York No Drawing. Continuation of application Serial No. 320,003, November 16, 1928. This application September 17, 1932. Serial No. 633,686

18 Claims. (Cl. 260—6)

This invention relates to the art of preparing synthetic rubber-like compositions, and especially to the art of preparing such compositions from raw materials which themselves are not endowed with the resilience of rubber.

Rubber, because of its extraordinarily great resilience, high tensile strength, and resistance to many of the common corrosive materials, has found a very extensive employment in the construction of articles of many different kinds. However, natural rubber is comparatively expensive and possesses certain inherent disadvantages. Among the most important of these are its solubility in the common solvents, such as gasoline, benzene, and even vegetable or mineral oils; its perishability, rubber losing most of its strength and resiliency within a comparatively short time, especially if exposed to direct sunlight; and its sensitiveness to the presence of oxidizing substances, rubber being rapidly attacked and destroyed by chlorine, bromine, nitric acid, concentrated sulphuric acid, chromic acid, etc. The synthetic rubbers heretofore prepared have exhibited to an even greater degree the above-named disadvantages of natural rubber without possessing its great strength and lively resilience.

The chief object of this invention is to provide resilient compositions duplicating the more important physical properties of rubber, but without its chemical instability. Another object is to provide resilient, rubber-like materials which may readily be manufactured from inexpensive raw materials. Other objects will appear from the following description of the invention.

This invention, in brief, consists in dissolving a polymerized vinyl halide, at an elevated temperature, in a substantially non-volatile organic solvent, and allowing the solution to cool, whereupon it sets to a stiff rubbery gel.

From the points of view of chemical inertness, cheapness, and ease of manufacture, the polymerized vinyl halides are almost ideal raw materials. The vinyl halides are readily and very cheaply prepared from acetylene and the hydrogen halides, or even from calcium carbide and the hydrogen halides. They may be polymerized to soluble plastics, but may also be polymerized rapidly and completely in strong sunlight or ultra-violet light, or under the influence of heat and pressure, especially in the presence of a catalyst, with the formation of a tough horny white material which is chemically saturated, substantially insoluble at room temperatures in practically every solvent, and which is practically unaffected by oxidizing acids, even when hot or concentrated, or by atmospheric oxidation or sunlight. However, these completely polymerized vinyl halides, because of their horny consistency, their insolubility in the common volatile solvents such as alcohol, gasoline, acetone, etc., and their high melting points, are very difficult to form into useful articles.

Although they are insoluble in practically everything at normal temperatures, the completely polymerized vinyl halides are soluble in a large number of solvents at a sufficiently high temperature. It is accordingly to be understood that the term "insoluble polymerized vinyl halide", or other like terms which are hereinafter employed, refer to and define products such as those described in the preceding paragraph, which are insoluble in all ordinary solvents at room temperatures, although they may be soluble in many such solvents at elevated temperatures. Thus, if one part by weight of polymerized vinyl chloride is heated and mixed with two parts of o-nitro-diphenylether at a temperature of about 180° C. a homogeneous solution is obtained, which upon cooling to room temperatures, sets to a resilient rubbery solid of high tensile strength, but with a somewhat lower extensibility than ordinary soft rubber. It is unaffected by dilute sulfuric or nitric acids or sodium hydroxide solution, or by exposure to the weather.

The insoluble polymerized vinyl halides dissolve at high temperatures in a large number of solvents, forming stiff rubbery gels when cooled. For example, chloronaphthalene, o-nitro-diphenylether, dibutyl phthalate, tricresyl phosphate, and benzyl benzoate are excellent solvents for the purpose. Such substances as chlorbenzene, acetophenone, xylidene, anisole, pyridine, chlorphenol, nitrobenzene or nitrotoluene also form gels with good physical properties, but are too volatile for ordinary purposes, gradually evaporating and leaving behind the hard vinyl halide polymer. Certain others such as p-dichlorbenzene, dichloracetone, m-dinitrobenzene, naphthalene, or nitronaphthalene are good solvents for the vinyl halides, but are solids at room temperatures, so that the gel tends to harden and lose its resiliency. However, mixtures of these solid materials with each other, or with non-volatile liquid solvents such as those first mentioned above, may be liquid at room temperatures, and therefore be more useful than the pure solid material. In general aromatic hydrocarbons, chlorinated or nitrated aromatic hydrocarbons, aromatic ethers, ketones, or esters, aromatic amines, aromatic or mixed aliphatic and aromatic esters, ethers, or ketones, or esters of inorganic acids, which are sufficiently non-volatile, among others, have been found to be effective solvents for the purpose of this invention. However, the fatty oils and fatty acids as well as mineral oils or waxes do not appreciably dissolve the polymerized vinyl halides, even at fairly high temperatures. The particular type or types of compounds selected as solvents for the polymerized vinyl halide must depend on the cost of the various materials and on the chemical properties desired in the finished product.

It is evident that the properties of the rubbery gel which is obtained by dissolving the insoluble polymerized vinyl halide at an elevated temperature in an appropriate solvent and then cooling the product, may be varied between wide limits by varying the proportions of the polymer and the solvent or by selecting a solvent or mixture of solvents of the desired characteristics. An increased proportion of solvent in general gives a softer, more resilient, and more extensible product, whereas a decrease in the proportions of solvent gives a harder product of greater strength. A product which is generally satisfactory where a material resistant to acids is desired is made by dissolving one part by weight of insoluble polymerized vinyl chloride at a temperature of about 180° C. in from one to four parts of a solvent made by mixing two parts o-nitro-diphenylether, one part m-dinitrobenzene, and one part dinitrotoluene. This product is practically unaffected by exposure to oxidizing agents, or to direct sunlight, and is quite permanent, not deteriorating noticeably with age. Another composition with high resistance to gasoline contains 8 parts of insoluble polymerized vinyl chloride, 3 parts of tricresyl phosphate and 3 parts of dibutyl phthalate.

In general, elastic, rubber-like products are obtained by using from one-half to four parts of the solvent to one part of the insoluble polymerized vinyl halide, although the invention is not necessarily confined to these precise proportions. However, higher proportions of solvent give very soft and weak products, whereas lower proportions produce tough and horny products.

The product may readily be molded, extruded or otherwise formed to any desired shape by heating to a sufficiently high temperature. Two surfaces of the product may be caused to adhere one to the other by heating the surfaces to a temperature approaching that required to liquefy the composition, and then bringing them into contact. Fabrics may be impregnated or coated by spreading the composition over their surface while in a heated, liquid condition, especially if the composition is softened by the addition of a volatile solvent such as xylene or chlortoluene or even alpha ethyl alpha hexenaldehyde. However, other methods of manufacture may be employed if desired, the above being merely stated to illustrate the variety of means which may be employed in fabricating useful articles from the products of this invention.

If it is desired, pigments, or fillers, or other plastics compatible with the aforementioned products may be incorporated therewith, to cheapen the final material, or to lend it special properties, or for any other purpose.

Rubber-like compositions prepared in the manner hereinabove described are especially valuable in manufacturing articles or products which are normally exposed to severe oxidation or to the elements, conditions which cause a rapid deterioration of ordinary soft rubber. For example, fabric impregnated with such compositions, when manufactured into raincoats, or used for covering automobile tops, will remain serviceable and water-tight for many times the life of similar rubberized fabric.

Or, when a non-toxic solvent or mixture of solvents is employed in preparing the composition, it can be used in the manufacture of gas-masks which will not deteriorate during the storage period. Water-proof boots or shoes of this material will not crack or check, but will remain flexible and water-tight until they are worn out.

The compositions of this invention are excellent insulators, of high dielectric strength, and are therefore very useful in insulating electric wire. The insulating coatings may be applied in the customary manner by extrusion around the wire. They possess the great advantages over rubber that the insulation is permanently tough and flexible and does not require vulcanization. Since they contain no sulphur and do not corrode the copper wire, the tinning of the wire may be omitted. They are extraordinarily resistant to ozone and may therefore be used even on high tension wires.

Such compositions may be employed as a resilient, noiseless flooring or paving material, exhibiting a most remarkable resistance to wear or abrasion, especially when properly stiffened by the addition of fine pigments. Such flooring compositions have a very long life, and are not damaged by the accidental spillage of oils as are rubber floors.

Since they are practically unaffected by gasoline, the polymerized vinyl chloride gels containing properly selected solvents, when employed in lining gasoline hose, have a very long life, and do not contaminate the gasoline with dissolved substances, or flakes of the lining material. They are of especial value in coating or lining equipment or containers which come in contact with strongly corrosive materials such as the oxidizing acids, for which purpose no satisfactorily tough, non-fragile, corrosion resistant material has heretofore been developed.

In short, the compositions of this invention are almost universally applicable where a permanent, resilient material is desired.

It is to be understood that the term "halides" is employed in the appended claims in a generic sense to include chlorides, bromides, and iodides, but to exclude fluorides, a sense in which the term is commonly used.

This application is a continuation of my co-pending application Serial No. 320,003, filed November 16, 1928.

While I have herein disclosed with considerable particularity certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

I claim:

1. The method of manufacturing a resilient rubber-like composition, which comprises dissolving an insoluble polymerized vinyl halide at an elevated temperature in a composition which will dissolve the polymerized vinyl halide only at temperatures considerably above room temperature, in such proportions as to form a stiff, resilient gel at ordinary temperatures, and causing the composition to gel by cooling it.

2. The method of manufacturing a resilient rubber-like composition, which comprises dissolving insoluble polymerized vinyl chloride at an elevated temperature in a composition which will dissolve the polymerized vinyl halide only at temperatures considerably above room temperature, in such proportions as to form a stiff, resilient gel at ordinary temperatures, and causing the composition to gel by cooling it.

3. The method of manufacturing a resilient rubber-like composition, which comprises dissolving insoluble polymerized vinyl chloride at an elevated temperature in a substantially non-volatile composition which will dissolve the polymerized vinyl halide only at temperatures considerably above room temperature, in the proportions of one part of the polymer and one-half to four parts of the solvent, and causing the composition to gel by cooling it.

4. The method of manufacturing a resilient rubber-like composition, which comprises dissolving insoluble polymerized vinyl chloride at an elevated temperature in a substantially non-volatile, neutral, liquid composition which will dissolve the polymerized vinyl halide only at temperatures considerably above room temperature, in the proportions of one part of the polymer and one-half to four parts of the solvent, and causing the composition to gel by cooling it.

5. The method of manufacturing a resilient rubber-like composition, which comprises dissolving one part of insoluble polymerized vinyl chloride at an elevated temperature in from one-half to four parts of a substantially non-volatile liquid composition consisting largely of aromatic substances, which composition will dissolve the polymerized vinyl chloride only at temperatures considerably above room temperature, and causing the composition to gel by cooling it.

6. The method of manufacturing a resilient rubber-like composition, which comprises dissolving one part of insoluble polymerized vinyl chloride at an elevated temperature in from one-half to four parts of a substantially non-volatile liquid aromatic composition comprising nitro compounds, which composition will dissolve the polymerized vinyl chloride only at temperatures considerably above room temperature, and causing the composition to gel by cooling it.

7. The method of manufacturing a resilient rubber-like composition, which comprises dissolving one part of insoluble polymerized vinyl chloride at an elevated temperature in from one-half to four parts of a substantially non-volatile liquid solvent comprising nitro derivatives of aromatic hydrocarbons, and causing the composition to gel by cooling it.

8. The method of manufacturing a resilient rubber-like composition, which comprises dissolving one part of insoluble polymerized vinyl chloride at an elevated temperature in from one-half to four parts of a substantially non-volatile liquid composition which will dissolve the polymerized vinyl chloride only at temperatures considerably above room temperature, the said composition comprising o-nitro-diphenylether, and causing the composition to gel by cooling it.

9. The method of manufacturing a resilient rubber-like composition, which comprises dissolving one part of insoluble polymerized vinyl chloride at an elevated temperature in from one-half to four parts of a solvent containing o-nitro-diphenylether two parts, dinitrobenzene one part, and dinitrotoluene one part, and causing the composition to gel by cooling it.

10. A rubber-like resilient composition prepared by the method defined in claim 1.

11. A rubber-like resilient composition prepared by the method defined in claim 2.

12. A rubber-like resilient composition prepared by the method defined in claim 3.

13. A rubber-like resilient composition prepared by the method defined in claim 4.

14. A rubber-like resilient composition prepared by the method defined in claim 5.

15. A rubber-like resilient composition prepared by the method defined in claim 6.

16. A rubber-like resilient composition prepared by the method defined in claim 7.

17. A rubber-like resilient composition prepared by the method defined in claim 8.

18. A rubber-like resilient composition prepared by the method defined in claim 9.

WALDO L. SEMON.